(12) United States Patent
Bednarek

(10) Patent No.: US 11,485,272 B2
(45) Date of Patent: Nov. 1, 2022

(54) DEVICE FOR SECURING A MATERIAL HANDLING DEVICE IN FIXED LOCATION INSIDE A TRANSPORT VEHICLE AND RELATED METHOD

(71) Applicant: Sean D A Bednarek, Woodlands (CA)

(72) Inventor: Sean D A Bednarek, Woodlands (CA)

(*) Notice: Subject to any disclaimer, the term of this patent is extended or adjusted under 35 U.S.C. 154(b) by 45 days.

(21) Appl. No.: 17/188,584

(22) Filed: Mar. 1, 2021

(65) Prior Publication Data

US 2021/0276479 A1 Sep. 9, 2021

Related U.S. Application Data

(60) Provisional application No. 62/984,617, filed on Mar. 3, 2020.

(51) Int. Cl.
*B60P 7/08* (2006.01)
*B62B 3/02* (2006.01)
*B60P 1/64* (2006.01)

(52) U.S. Cl.
CPC .......... *B60P 7/0807* (2013.01); *B60P 1/6409* (2013.01); *B62B 3/02* (2013.01)

(58) Field of Classification Search
CPC ......... B60P 7/0807; B60P 1/6429; B62B 3/02
USPC .......... 410/96, 107, 101, 106, 2, 3, 4, 7, 80; 414/498, 921, 228, 462
See application file for complete search history.

(56) References Cited

U.S. PATENT DOCUMENTS

| 4,762,449 | A  | * | 8/1988 | St. Pierre | B60P 7/0807 410/112 |
|---|---|---|---|---|---|
| 8,327,979 | B2 | * | 12/2012 | Lynch | B66F 7/24 187/241 |
| 8,602,699 | B1 | * | 12/2013 | Dickson | B60P 3/073 410/3 |
| 9,994,142 | B2 | * | 6/2018 | Rugg | B60P 3/077 |
| D866,111 | S  | * | 11/2019 | Newgent | D34/28 |
| 11,167,683 | B2 | * | 11/2021 | Carpenter | B60P 7/0807 |
| 2003/0165376 | A1 | * | 9/2003 | Bruno | B60P 3/122 414/462 |

* cited by examiner

*Primary Examiner* — D Glenn Dayoan
*Assistant Examiner* — Sunsurraye Westbrook
(74) *Attorney, Agent, or Firm* — Christopher J. Dynowski; Ryan W. Dupuis; Ade & Company Inc.

(57) ABSTRACT

A device for securing a material handling device in a transport vehicle comprises an arm supporting at opposite ends a first attachment member configured for attaching to a shaft of a handle of the material handling device, which is configured for steerably moving the material handling device, and a second attachment member configured for attaching to the transport vehicle. The arm is movable relative to the first attachment member between a working position in which the arm is arranged to extend outwardly from the shaft of the handle to position the second attachment member at a spaced location therefrom for connecting to the transport vehicle, so as to secure the material handling device in fixed relation to the transport vehicle, and a storage position in which the arm is arranged generally parallel to the shaft of the handle to position the second attachment member at or adjacent the shaft.

15 Claims, 4 Drawing Sheets

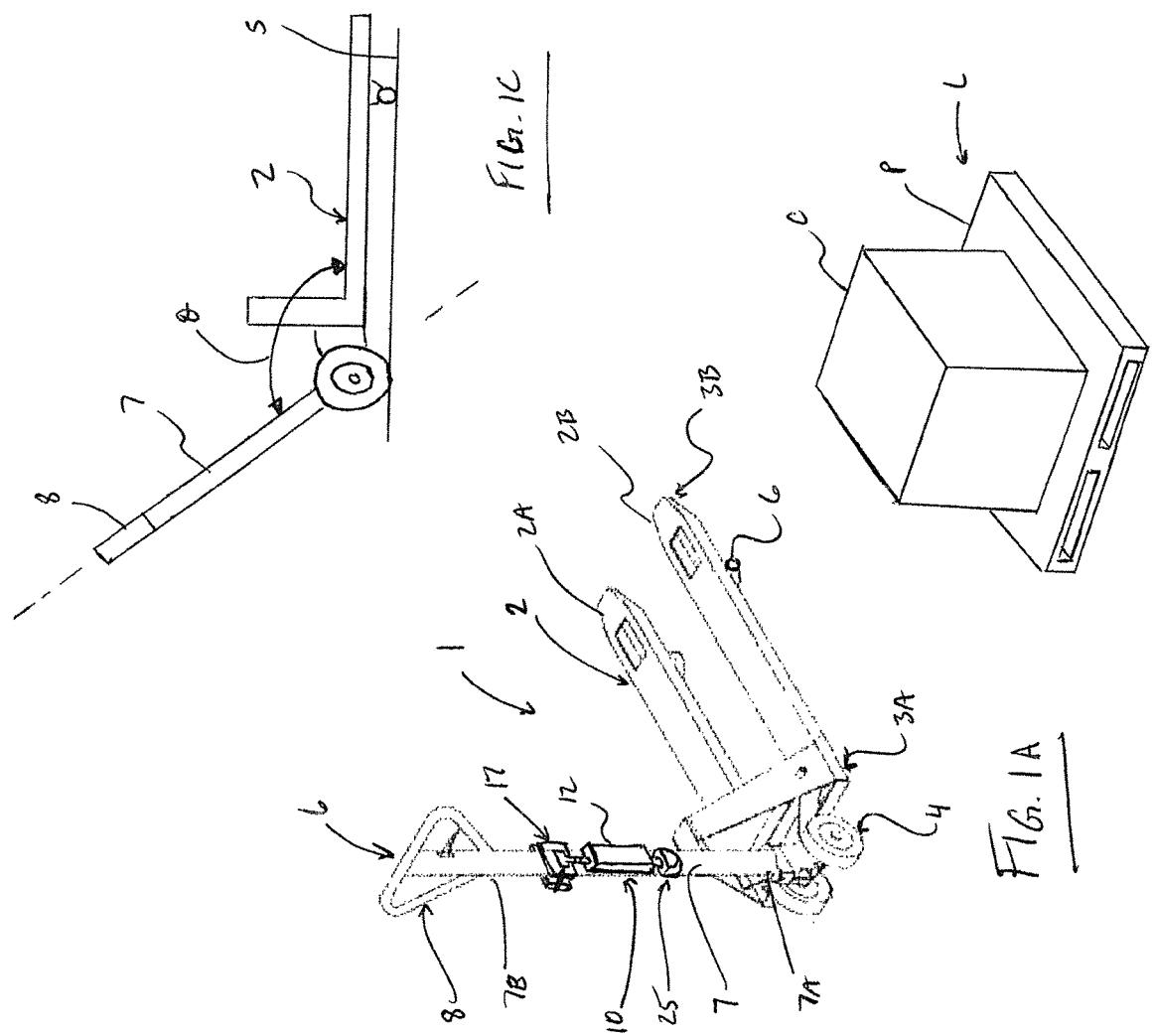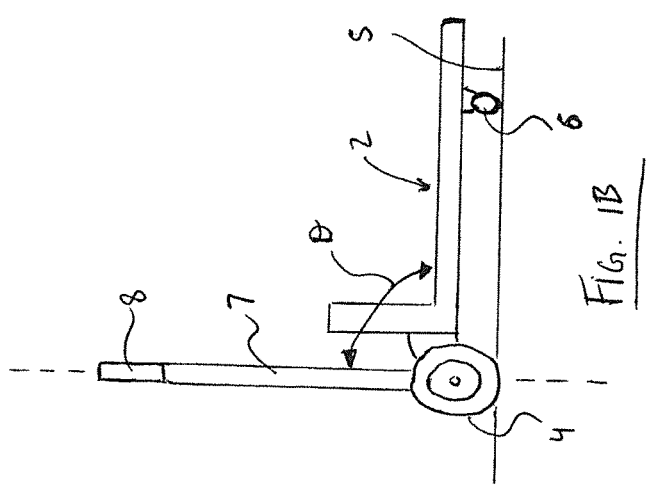

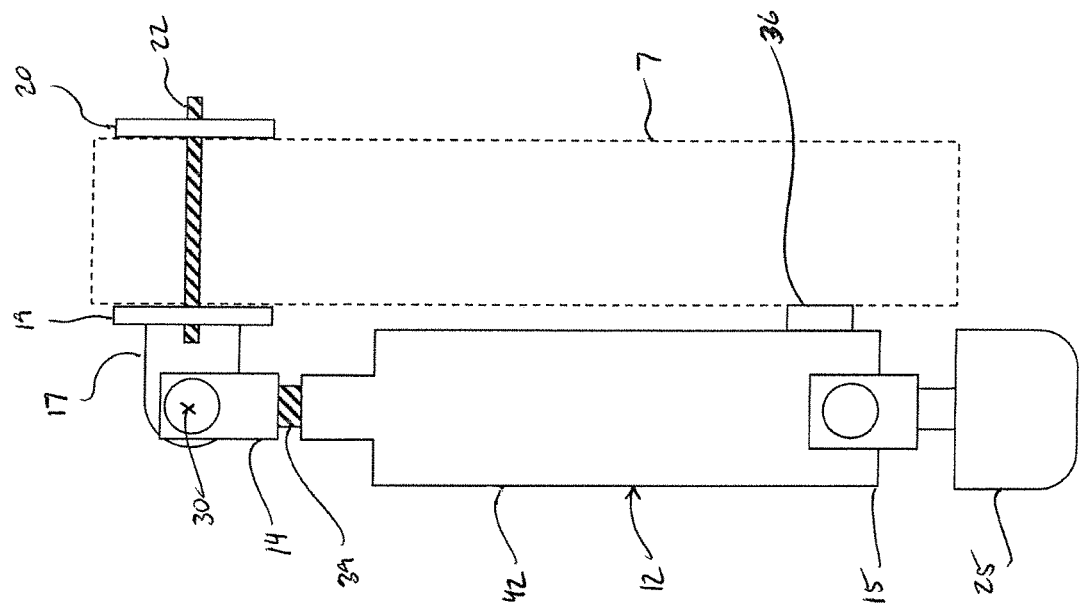
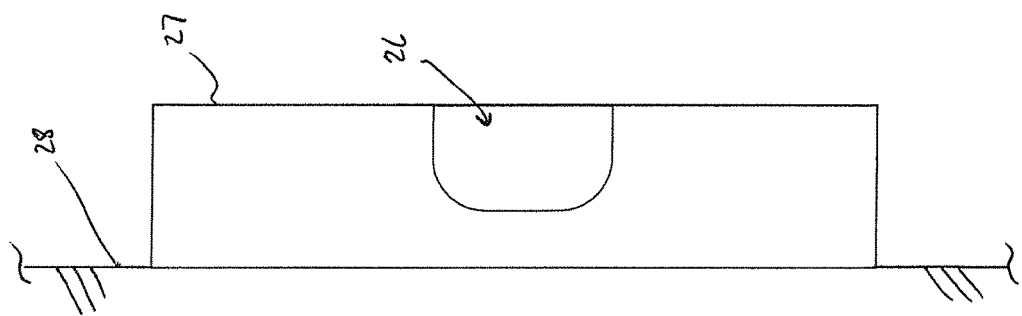
FIG. 4

DEVICE FOR SECURING A MATERIAL HANDLING DEVICE IN FIXED LOCATION INSIDE A TRANSPORT VEHICLE AND RELATED METHOD

This application claims the benefit under 35 U.S.C. 119(e) of U.S. Provisional Application Ser. No. 62/984,617 filed Mar. 3, 2020.

FIELD OF THE INVENTION

The present invention relates generally to a device for securing a material handling device, such as a pallet jack or truck, in fixed location inside a transport vehicle, and more particularly to such a device comprising an arm attached at one end thereof to a handle of the material handling device and which remains mounted thereto when not in use to secure location of the material handling device within the transport vehicle.

BACKGROUND

Material handling devices such as manual pallet jacks or trucks are often transported along with cargo inside a transport vehicle, such as a truck with an enclosed cargo compartment or an enclosed transport trailer towed by a towing vehicle like a highway tractor, so that the cargo or load inside the vehicle can be manually unloaded therefrom. It is important to secure such material handling devices, which are transported inside the vehicle, in fixed location to prevent damage to the vehicle and to the material handling device during transport.

One way in which to fixedly locate the material handling device, particularly a pallet jack or truck, is to turn the whole of the device onto its side so as to immobilize the same by removing its traction components, which are typically wheels or rollers arranged for rolling movement across a support surface, from engagement with the underlying support surface. However, this is not desirable as such devices are typically quite heavy and are not designed to be immobilized in this manner, such that there is considerable risk of injury to a user.

Another way in which to immobilize the material handling device is provided by a device sold under the trade name "Pallet Truck Stop" which is in effect a pad that is placed on the floor of the transport vehicle. The Pallet Truck Stop forms a central depression in which to locate a steerable main wheel of the manual pallet jack/truck so as to remove it from contact with the support surface defined by the vehicle floor, thus immobilizing the pallet jack/truck. However, this device is separate from the pallet jack/truck so as to require the user to store it separately from the pallet jack/truck when the same is in use moving a load.

SUMMARY OF THE INVENTION

According to an aspect of the invention there is provided an apparatus for securing a material handling device within a transport vehicle.

Generally speaking, the material handling device has a platform for supporting a load above a support surface, wherein typically the platform is configured to be raised or lowered relative to the support surface. The material handling device further includes a steerable traction element operatively supported on the platform for engagement with the support surface so that the platform is steerably movable thereacross, at least one auxiliary traction element operatively supported on the platform for engagement with the support surface so that the platform is supported for movement across the support surface, and a handle having a shaft operatively coupled to the steerable traction element for manually steering said steerable traction element and a gripping portion supported on the shaft at a spaced location from the platform arranged for grasping by a user, wherein the handle is configured for movement between a locked position in which the handle is in fixed position relative to the platform so as to be substantially inoperable to move the platform and a working position in which the handle is movable relative to the platform so as to be operable to steer the platform. Furthermore, typically the handle is further configured to actuate raising or lowering of the platform relative to the support surface.

The apparatus comprises:

an arm extending between first and second ends;

a first attachment member at the first end configured for attaching to the shaft of the handle of the material handling device;

a second attachment member at the second end configured for attaching to the transport vehicle;

wherein the arm is movable relative to the first attachment member between a working position in which the arm is arranged to extend outwardly from the shaft of the handle to position the second attachment member at a spaced location therefrom for connecting to the transport vehicle, so as to secure the material handling device in fixed relation to the transport vehicle, and a storage position in which the arm is arranged generally parallel to the shaft of the handle to position the second attachment member at or adjacent the shaft.

This provides a simple arrangement for securing the material handling device inside the transport vehicle that can remain mounted at all times even when the material handling device is in use to transport a load.

The apparatus is particularly, but not exclusively, suited for use with a pallet jack or truck.

Preferably, the first attachment member and the arm are pivotally interconnected to define a pivot axis about which the arm is arranged to pivotally rotate between the storage and working positions.

Preferably, the apparatus further includes a securing device attached to the arm and configured to removably couple to the shaft of the handle to retain the arm in the storage position.

In the illustrated arrangement, the securing device comprises a magnetic device configured to generate a magnetic field for magnetically removably attaching to the shaft of the handle.

In the illustrated arrangement, the magnetic device is a permanent magnet.

Preferably, the securing device is located on the arm at a spaced location from the first end of the arm.

In the illustrated arrangement, the arm extends linearly from the first end to the second end.

Preferably, the arm is adjustable in length between the first and second ends.

In the illustrated arrangement, the second attachment member is pivotally connected to the second end of the arm to define a pivot axis for pivotal movement relative to the arm.

According to another aspect of the invention there is provided a method of using a securing apparatus with a material handling device to secure the material handling device in fixed location inside a transport vehicle, wherein the material handling device includes a platform for supporting thereon a load to be moved and a handle with a shaft extending away from the platform configured for manually steering the material handling device, the method comprising:

providing the securing apparatus mounted to the shaft of the handle of the material handling device;

positioning the material handling device, with the securing apparatus mounted thereon, adjacent an upstanding interior wall of the transport vehicle; and connecting a free end of the securing apparatus to the interior wall of the transport vehicle so that the material handling device is secured in fixed relation inside the transport vehicle via the securing apparatus.

Preferably, positioning the material handling device adjacent the interior wall of the transport vehicle comprises arranging the handle in a locked position in which the handle is inoperable for steering the material handling device.

Preferably, after disconnecting the free end of the securing apparatus from the interior wall of the transport vehicle, the method further includes rotating the apparatus about a pivot axis at or adjacent the shaft of the handle to position the free end of the securing apparatus at or adjacent the shaft while the apparatus remains mounted thereto.

Preferably, after rotating the apparatus about the pivot axis, the method further includes using the material handling device to move a load from a first work area to a second work area with the apparatus mounted on the shaft and arranged in the storage position.

In one arrangement, before connecting the free end of the securing apparatus to the interior wall, the method further includes adjusting a distance of the free end relative to the shaft of the handle so as to substantially match a distance of the handle to the interior wall.

In one arrangement, the material handling device is a pallet truck.

According to a further aspect of the invention there is provided a device for securing a material handling device in a transport vehicle comprising an arm supporting at opposite ends a first attachment member configured for attaching to a shaft of a handle of the material handling device, which is configured for steerably moving the material handling device, and a second attachment member configured for attaching to the transport vehicle. The arm is movable relative to the first attachment member between a working position in which the arm is arranged to extend outwardly from the shaft of the handle to position the second attachment member at a spaced location therefrom for connecting to the transport vehicle, so as to secure the material handling device in fixed relation to the transport vehicle, and a storage position in which the arm is arranged generally parallel to the shaft of the handle to position the second attachment member at or adjacent the shaft.

BRIEF DESCRIPTION OF THE DRAWINGS

The invention will now be described in conjunction with the accompanying drawings in which:

FIG. 1A is a perspective view of a manual pallet jack or truck, as an example of material handling device, with an arrangement of apparatus according to the present invention;

FIG. 1B is similar to FIG. 1A but schematically shows the pallet jack/truck in elevational view with a handle thereof arranged in a locked position;

FIG. 1C is similar to FIG. 1A but schematically shows the pallet jack/truck in elevational view with the handle thereof arranged in working position;

FIG. 4 is an enlarged elevational view schematically showing the arrangement of apparatus of FIG. 1A in a storage position relative to the handle shaft.

In the drawings like characters of reference indicate corresponding parts in the different figures.

DETAILED DESCRIPTION

Figure 2:
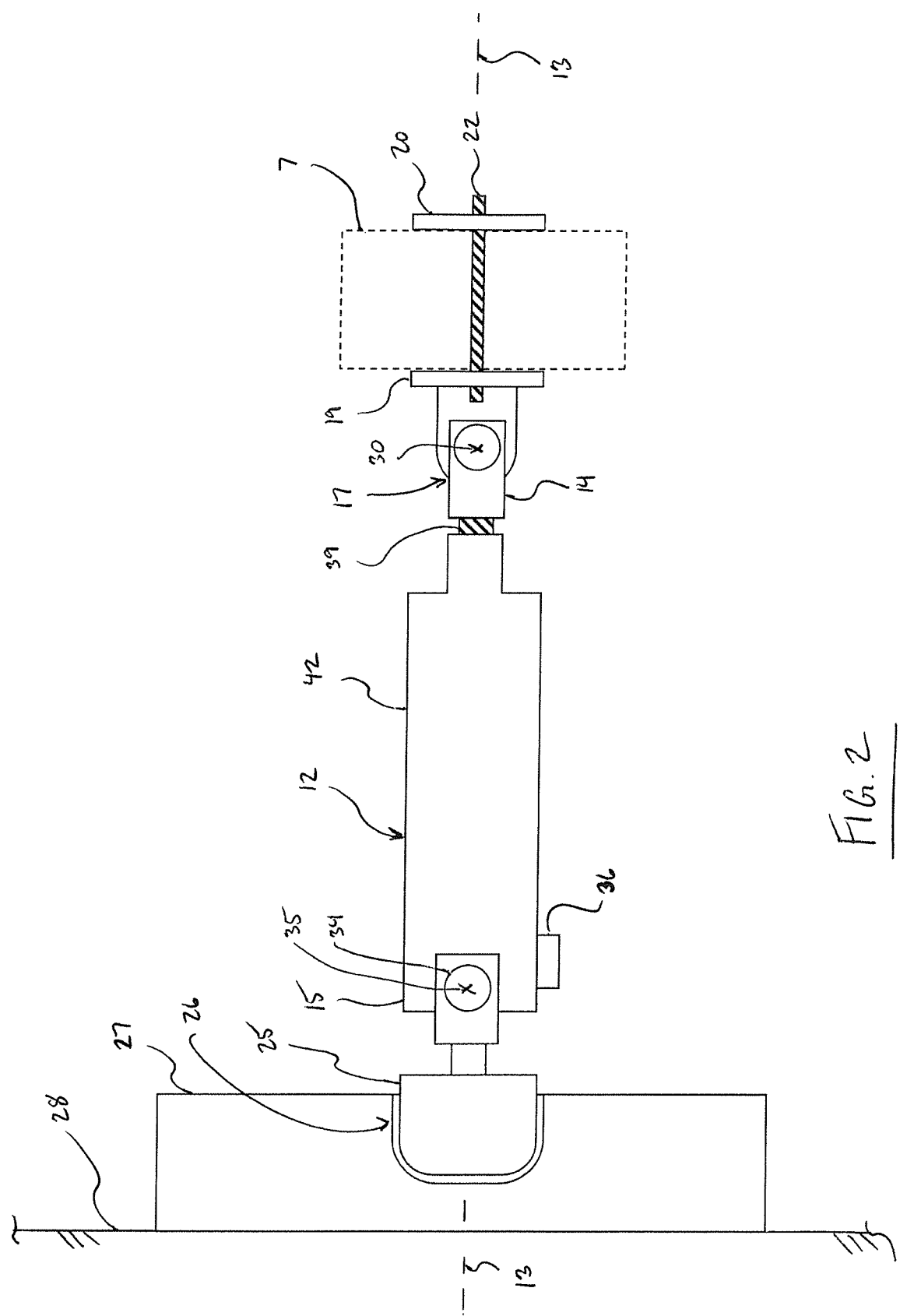
FIG. 2 is an enlarged elevational view schematically showing the arrangement of apparatus of FIG. 1A in a working position relative to a handle shaft of the pallet jack/truck and a wall rail of a transport vehicle.

The accompanying figures show an apparatus indicated at reference numeral 10 for securing a material handling device such as a pallet truck or jack 1 within a transport vehicle.

The material handling device 1, shown more clearly in FIGS. 1A-1C is a manual unit which is movable around a work area, such as the inside of the transport vehicle, by a user who acts to displace the material handling device by pushing or pulling the same. The material handling device 1 comprises a base platform 2 for supporting a load L (schematically shown) thereon, such as a cargo C supported on an underlying pallet P, above a support surface S. In the illustrated arrangement showing a pallet jack, the platform 2 comprises bifurcated forks 2A and 2B which are interconnected at a proximal end 3A of the platform, and are separate so as to be spaced from another at their free ends located at a distal end 3B of the platform. The forks 2A, 2B collectively define a substantially planar upper surface for supporting the load L. Furthermore, the platform 2 is configured to be raised or lowered relative to the underlying support surface S, typically by a hydraulic system as is conventionally known and thus not described in further detail herein.

Moreover, the material handling device 1 includes a steerable traction element 4 in the form of a wheel operatively supported on the platform 2 for rolling engagement with the support surface S so that the platform is steerably movable thereacross. There is also provided at least one auxiliary traction element 5 which is operatively supported on the platform for engagement with the support surface S so that the platform is stably supported thereby for movement across the support surface S. In the illustrated arrangement, there is a pair of auxiliary traction elements in the form of rollers, one for each fork 2A, 2B. The steerable wheel 4 is operatively supported at the proximal end 3A of the platform, and the auxiliary rollers are supported closer to the distal end 3B than to the proximal end 3A so as to be generally at the distal end 3B of the platform. Generally speaking, neither the steerable traction element nor the auxiliary traction elements have brakes to resist or prevent rotation thereof.

The material handling device 1 also includes a handle 6 having an elongate shaft 7 which is operatively coupled to the main steerable wheel 4 for manually steering the same. Generally speaking, a bottom end 7A of the shaft 7 is operatively coupled to the steerable main wheel 4, and extends therefrom to a top end 7B. Thus the handle shaft 7 generally extends away from the platform 2, which is basically at the underlying support surface S, so as to locate a gripping portion 8 arranged for grasping by a user at a suitable height for the user to comfortably manually move the material handling device. The gripping portion 8 is thus supported on the shaft 7 at a spaced location from the platform 2, and generally at a spaced height above the platform when the shaft is oriented more upright than horizontal. Typically the gripping portion 8 is connected at the top end 7B of the shaft. The handle 6 is configured to actuate raising or lowering of the platform 2 relative to the support surface S via the aforementioned hydraulic system. The handle 6 is further configured for movement between a locked position, as shown in FIG. 1B, in which the handle is in fixed position relative to the platform 2, so as to be substantially inoperable to steer the platform, and a working position, as shown in FIG. 1C, in which the handle is movable relative to the platform so as to be operable to steer the platform. Generally speaking, in the locked position the shaft 7 is arranged at substantially a right angle to the platform 2 which is generally planar and oriented substantially parallel to the support surface S so that it is extremely difficult to effectively transfer an applied pushing or pulling force to displace the material handling device 1, even though in some arrangements, it may still be possible to rotate the steerable wheel 4. Furthermore, in the working position, the handle 6 is generally freely movable relative to the platform 2 and is generally held at an obtuse angle to the platform 2 for displacing the same across the support surface S. In FIGS. 1B and 1C the relative angle between the handle 6 and the platform 2 is indicated at θ.

Figure 3:
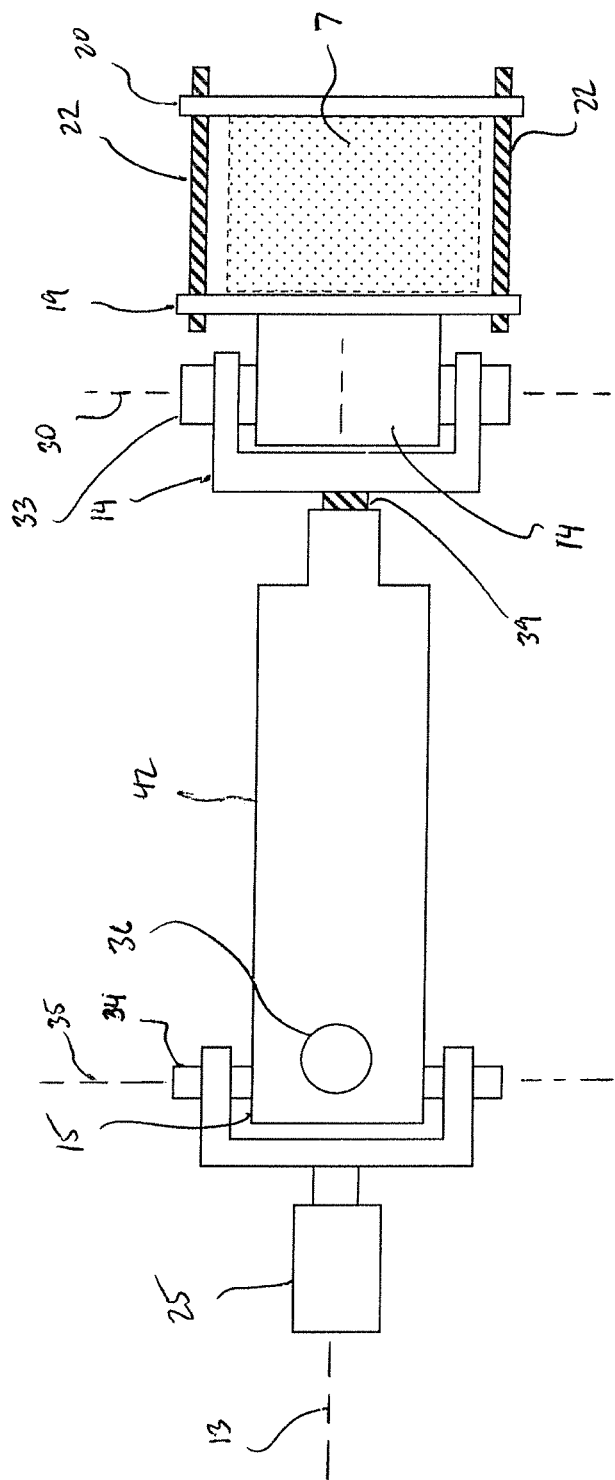
FIG. 3 is an enlarged bottom plan view schematically showing the arrangement of apparatus of FIG. 1A in the working position, with the wall rail omitted for convenient illustration.

Turning now to the securing apparatus 10, the foregoing comprises a main arm 12 which extends linearly along a longitudinal axis 13 between longitudinally opposite first and second ends 14, 15. The apparatus 10 further includes a first attachment member 17 at the first end 14 of the arm that is configured for attaching to the shaft 7 of the handle 6 of the material handling device. In the illustrated arrangement, as more clearly shown in FIGS. 2 and 3, the first attachment member 17 comprises a pair of opposing plates 19, 20 which are interconnected by a pair of fasteners 22, for example threaded bolts, such that the plates 19, 20 are arranged in a clamping configuration to clamp the handle shaft 7 therebetween. Furthermore, this arrangement allows the first attachment member 17 to be removably attachable to the handle 6.

At the second end 15 of the arm there is provided a second attachment member 25 which is configured for attaching to the transport vehicle. In the illustrated arrangement, the second attachment member 25 comprises a male connector element which is configured for removable insertion into a female receptacle 26 defined by a railing system 27 provided on an interior wall 28 of the transport vehicle, as more clearly shown in FIG. 2. The male and female connector elements are known, commercially available components and thus are not described in further detail herein. For example, the railing system 27 is that of the E-track logistic post type.

In order to secure the material handing device 1 to the transport vehicle and thus immobilize the former, the arm 12 extends outwardly from the shaft 7 of the handle 6 in a working position so as to position the second attachment member 25 at a spaced location from the handle shaft for connecting to the transport vehicle. For immobilization of the material handling device 1 in this manner, the handle 6 is preferably arranged in the locked position so that the material handling device 1 as a whole can be maintained in fixed location within the transport vehicle simply by fixedly interconnecting the handle thereof and the transport vehicle.

When it is not desired to use the apparatus 10 to immobilize the material handling device 1, instead of removing the whole apparatus, the arm 12 is moved from the outwardly extending working position to a storage position as shown more clearly in FIG. 4 in which the arm 12 is arranged generally parallel to and adjacent the shaft 7 of the handle so as not to protrude outwardly and obstruct range of movement of the handle when used to move the material handling device 1.

In the illustrated arrangement, the first attachment member 17 and the arm 12 are pivotally interconnected to define a pivot axis 30 about which the arm 12 is arranged to pivotally rotate between the storage and working positions. More specifically, in the illustrated arrangement the first end 14 of the arm forms a clevis so that a first end of the first attachment member 17 is attached thereto by a pin 33 that defines the pivot axis 30.

Similarly, in the illustrated arrangement the second attachment member 25 is pivotally connected to the arm 12 at pin 34 so that the second attachment member 25 is pivotally rotatable about a pivot axis 35 defined at the arm's second end 15. This allows for an angular adjustment of the second attachment member 25 relative to the axis 35 for proper insertion into receptacle 26.

Both the arm pivot axis 30 and the second attachment member pivot axis 35 are oriented perpendicularly transversely to the longitudinal axis 13 of the arm. However, in either case there is no relative movement relative to a longitudinal direction of the arm 12 provided between the arm and either one of the first attachment member and the second attachment member.

Furthermore, the apparatus 10 includes a securing device 36 attached to the arm, in the form of a permanent magnet, and configured to removably couple to the shaft of the handle to retain the arm in the storage position. The permanent magnet defines one example of a magnetic device configured to generate a magnetic field for magnetically removably attaching to the handle shaft 7, which is metallic. The securing device 36 is located on one side of the arm 12 at a spaced location from the first arm end 14, and generally closer to the second end 15 than to the opposite end 14, so as to be more effective at resisting applied rotational forces to retain the arm 12 in the storage position.

Additionally, the arm 12 is adjustable in length between the first and second ends 14, 15 so as to be able to locate the second attachment member 25 at a suitably spaced distance from the shaft 7 of the handle 6 for connecting to the transport vehicle. In the illustrated arrangement, adjustability of arm length is effected by supporting the first end 14 on a threaded connector 39 extending axially of the arm 12 and forming an extensible portion of the arm so that the first end 14 can be axially displaced relative to a base portion 42 of the arm defining the second end 15 which is stationary with respect to the extensible movement.

In use, as a first step the apparatus 10 is mounted to the shaft 7 of the handle 6 of the material handling device. Preferably, the first attachment member 17 is mounted at a spaced distance from the bottom end 7A of the shaft, which is greater than a distance between the first and second attachment members 17, 25 but at minimum substantially equal to this distance, so that the arm 12 is movable from the working position to the storage position in downward rotational motion about axis 30, such that gravity can help to retain the arm 12 in the storage position. Mounting the first attachment member 17 to the handle shaft 7 acts to locate the arm pivot axis 30 at or adjacent thereto and to position the pivot axis 30 in transverse orientation thereto.

When it is desired to immobilize the material handling device 1 for subsequent transport in the transport vehicle, the device 1 is positioned adjacent the upstanding interior wall 28 of the transport vehicle. A free end of the mounted securing apparatus 10, defined by the second attachment member 25, is connected to the interior wall 28 such as via the provided railing system 27 which is mounted thereon. A distance of the free end 25 to the handle 6 may be adjusted so that the securing apparatus forms a bridge of suitable length between the handle and the interior wall to allow the material handling device 1 to be positioned closely to the wall 28 while remaining retaining normal engagement with support surface S, via the traction elements, to be otherwise stably supported thereon. In other words, the distance of the free end 25 relative to the shaft 7 may be adjusted so as to substantially match a distance of the handle to the interior wall when the material handling device 1 is arranged at its to-be-fixed immobilizing location, so that the apparatus spans between the handle 6 and the interior wall 28.

When it is desired to operate the material handling device after transport, the free end 25 of the apparatus 10 is disconnected from the interior wall of the transport vehicle and the apparatus is rotated about the pivot axis 30 located at or adjacent the handle to the storage position so that the free end 25 is located at or adjacent the shaft 7, with the arm 12 lying alongside the same. Thus the apparatus is arranged in a storage position while remaining mounted to the shaft.

Afterwards, that is after arranging the apparatus in the storage position, the material handling device can be used to move a load from a first work area to a second work area, with the apparatus mounted on the shaft and arranged in the storage position.

This provides a simple arrangement for securing the material handling device inside the transport vehicle that can remain mounted at all times even when the material handling device is in use to transport a load.

The apparatus is particularly, but not exclusively, suited for use with a pallet jack or truck. Typically such a pallet jack or truck is of the manual type meaning that it is propelled by a user.

It will be appreciated that the apparatus may also be used with a self-propelled pallet jack or truck such as that which is electrically powered for both driving a drive wheel, which is typically the steerable wheel, and for raising or lowering the load platform. In this case, in regard to movement of the material handling device around the work area, the user primarily acts to steer the same. In this type of pallet jack/truck, arranging a handle thereof in an upright position acts to engage an electric brake on at least one of the traction elements, typically the drive wheel. Thus, even though this type of material handling device has brakes, it remains desirable to secure it in fixed location inside the transport vehicle using the apparatus 10 to prevent the pallet jack/truck from inadvertently moving around while the transport vehicle is in motion and to maintain the handle in the upright position in which the brake is engaged.

The scope of the claims should not be limited by the preferred embodiments set forth in the examples but should be given the broadest interpretation consistent with the specification as a whole.

The invention claimed is:

1. An apparatus for securing a material handling device within a transport vehicle, wherein the material handling device has a platform for supporting a load above a support surface, the platform being configured to be raised or lowered relative to the support surface, a steerable traction element operatively supported on the platform for engagement with the support surface so that the platform is steerably movable thereacross, at least one auxiliary traction element operatively supported on the platform for engagement with the support surface so that the platform is supported for movement across the support surface, and a handle having a shaft operatively coupled to the steerable traction element for manually steering said steerable traction element and a gripping portion supported on the shaft at a spaced location from the platform and arranged for grasping by a user, wherein the handle is configured to actuate raising or lowering of the platform relative to the support surface, and wherein the handle is further configured for movement between a locked position in which the handle is in fixed position relative to the platform so as to be substantially inoperable to steer the platform and a working position in which the handle is movable relative to the platform so as to be operable to steer the platform, the apparatus comprising:

an arm extending between first and second ends;
a first attachment member at the first end configured for attaching to the shaft of the handle of the material handling device;
a second attachment member at the second end configured for attaching to the transport vehicle;
wherein the arm is movable relative to the first attachment member between a working position in which the arm is arranged to extend outwardly from the shaft of the handle to position the second attachment member at a spaced location therefrom for connecting to the transport vehicle, so as to secure the material handling device in fixed relation to the transport vehicle, and a storage position in which the arm is arranged generally parallel to the shaft of the handle to position the second attachment member at or adjacent the shaft.

2. The apparatus of claim 1 wherein the first attachment member and the arm are pivotally interconnected to define a pivot axis about which the arm is arranged to pivotally rotate between the storage and working positions.

3. The apparatus of claim 1 further including a securing device attached to the arm and configured to removably couple to the shaft of the handle to retain the arm in the storage position.

4. The apparatus of claim 3 wherein the securing device comprises a magnetic device configured to generate a magnetic field for magnetically removably attaching to the shaft of the handle.

5. The apparatus of claim 4 wherein the magnetic device is a permanent magnet.

6. The apparatus of claim 2 wherein the securing device is located on the arm at a spaced location from the first end of the arm.

7. The apparatus of claim 1 wherein the arm extends linearly from the first end to the second end.

8. The apparatus of claim 1 wherein the arm is adjustable in length between the first and second ends.

9. The apparatus of claim 1 wherein the second attachment member is pivotally connected to the second end of the arm to define a pivot axis for pivotal movement relative to the arm.

10. A method of using a securing apparatus with a material handling device to secure the material handling device in fixed location inside a transport vehicle, wherein the material handling device includes a platform for supporting thereon a load to be moved and a handle with a shaft extending away from the platform configured for manually steering the material handling device, the method comprising:

providing the securing apparatus mounted to the shaft of the handle of the material handling device;
positioning the material handling device, with the securing apparatus mounted thereon, adjacent an upstanding interior wall of the transport vehicle; and connecting a free end of the securing apparatus to the interior wall of the transport vehicle so that the material handling device is secured in fixed relation inside the transport vehicle via the securing apparatus.

11. The method of claim 10 wherein positioning the material handling device adjacent the interior wall of the transport vehicle comprises arranging the handle in a locked position in which the handle is inoperable for steering the material handling device.

12. The method of claim 10 further including, after disconnecting the free end of the securing apparatus from the interior wall of the transport vehicle, rotating the apparatus about a pivot axis at or adjacent the shaft of the handle to position the free end of the securing apparatus at or adjacent the shaft in a storage position while the apparatus remains mounted thereto.

13. The method of claim 12 further including, after rotating the apparatus about the pivot axis, using the material handling device to move a load from a first work area to a second work area with the apparatus mounted on the shaft and arranged in the storage position.

14. The method of claim 10 further including, before connecting the free end of the securing apparatus to the interior wall, adjusting a distance of the free end relative to the shaft of the handle so as to substantially match a distance of the handle to the interior wall.

15. The method of claim 10 wherein the material handling device is a pallet truck.

\* \* \* \* \*